J. T. JAMES.
SAWS.
No. 195,610.  Patented Sept. 25, 1877.
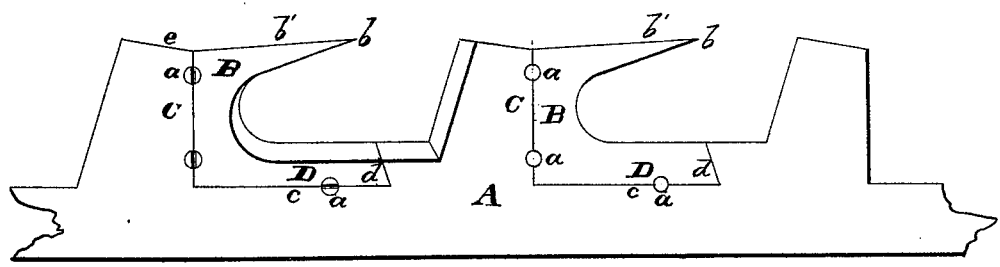
WITNESSES
INVENTOR
John T. James.
By H A Seymour.
ATTORNEY

UNITED STATES PATENT OFFICE.

JOHN T. JAMES, OF LOVE'S MILLS, ASSIGNOR TO HIMSELF AND JOSIAH COLE, OF WASHINGTON COUNTY, VIRGINIA.

IMPROVEMENT IN SAWS.

Specification forming part of Letters Patent No. 195,610, dated September 25, 1877; application filed May 3, 1877.

*To all whom it may concern:*

Be it known that I, JOHN T. JAMES, of Love's Mills, in the county of Washington and State of Virginia, have invented certain new and useful Improvements in Saws; and I do hereby declare the following to be a full, clear, and exact description of the invention, such as will enable others skilled in the art to which it pertains to make and use it, reference being had to the accompanying drawings, which form part of this specification.

My invention relates to an improvement in saws; the object of the same being to provide a saw with detachable saw-teeth, the main body of the saw-blade of such form that the cutting-edge shall consist of chisel-shaped teeth, each of which has a heel portion, formed in such a manner that they serve to steady the blade of the saw and allow the blade to be gradually fed into the timber, and also serve to raise the cuttings from the saw-kerf, and thereby prevent any wedging action, often created by the shavings falling between the teeth and saw-kerf.

The drawing represents a plan view of a section of a saw-blade having my invention embodied therein.

A represents a saw-blade, having the insertible teeth B secured therein by means of rivets or screws $a$; or the teeth may be secured in any other desired manner, as, for instance, by cams or wedges. Teeth B consist of the chisel cutting-edge $b$, which latter are outwardly inclined, as shown by the outer edge $b'$, while the rear portion of the teeth have a firm bearing against the front edge of the heel portion or projection C. The inner portion D of tooth B is seated against the main body of the blade at $e$, the end being cut diagonally, as shown at $d$, which feature materially assists in retaining the tooth against displacement.

As the chisel-shaped teeth B have a tendency to work inwardly into the timber, or, in other words, to cut in line with the inclination of the teeth, I construct the saw-blade with heel portions C, the lower or working edges $e$ of which are slightly lower than the extreme cutting-points $b$ of the saw-teeth B, and thus the heel portions C serve as a free, firm bearing for the main body of the blade, and always allow the saw-teeth to cut freely.

This is an important feature of my invention, as in saws of ordinary construction, where no heel portion is provided for a bearing for the saw-blade, the chisel-shaped teeth, owing to their tendency to cut inwardly into the timber, impart severe strains to the saw-blade as knotty timber is operated upon, and often destroy the efficiency of the saw for such reasons.

Again, in saws of ordinary form, the shavings cut by the teeth fall between the teeth and the timber as the saw is passing through its upstroke, thus requiring extra pressure to force the timber snugly up against the saw, and also rendering great the liability of springing the saw by reason of knotty portions of the timber becoming wedged between the teeth and timber.

My improved construction of saw obviates the objections last noted, as each heel portion C in its upward movement operates to raise the shaving cut by the saw-tooth immediately above the same, and thereby keeps the saw-kerf always free from shavings or chips.

While my improved saw has all the beneficial results flowing from the employment of detachable saw-teeth, as the teeth may be readily replaced when worn or broken, the saw-blade, by reason of its peculiar form, is especially adapted for retaining the insertible saw-teeth in place by means of simple fastening devices, as comparatively little strain is brought to bear on the teeth, owing to the heel portions C in rear of each tooth, which serve not only to afford a firm backing for the teeth, but also to regulate the depth and direction of the cut, to equalize the strain upon all the teeth, and cause each to perform its share of the work, and also to steady the blade and prevent its being strained, bent, or otherwise injured while in use.

Having fully described my invention, what I claim as new, and desire to secure by Letters Patent, is—

1. A saw consisting of a saw-blade formed with heel portions the outer edge of which extends nearly to a line through the points of the teeth, and insertible teeth secured between the same, substantially as described.

2. The combination, with saw-blade A, having heel portions C formed therewith, the outer edges of said heel portions extending nearly to a line through the points of the teeth, of the insertible chisel saw-teeth B, substantially as described.

3. The combination, with saw-blade A, provided with heel portions C, the latter having an inclined edge, e, of the insertible saw-teeth B, substantially as described.

In testimony that I claim the foregoing I have hereunto set my hand this 1st day of May, 1877.

JOHN T. JAMES.

Witnesses:
    F. O. McCLEARY,
    A. W. BRIGHT.